June 4, 1946.   R. PECHKRANZ   2,401,506
PROJECTION APPARATUS
Filed Oct. 23, 1942   3 Sheets-Sheet 1
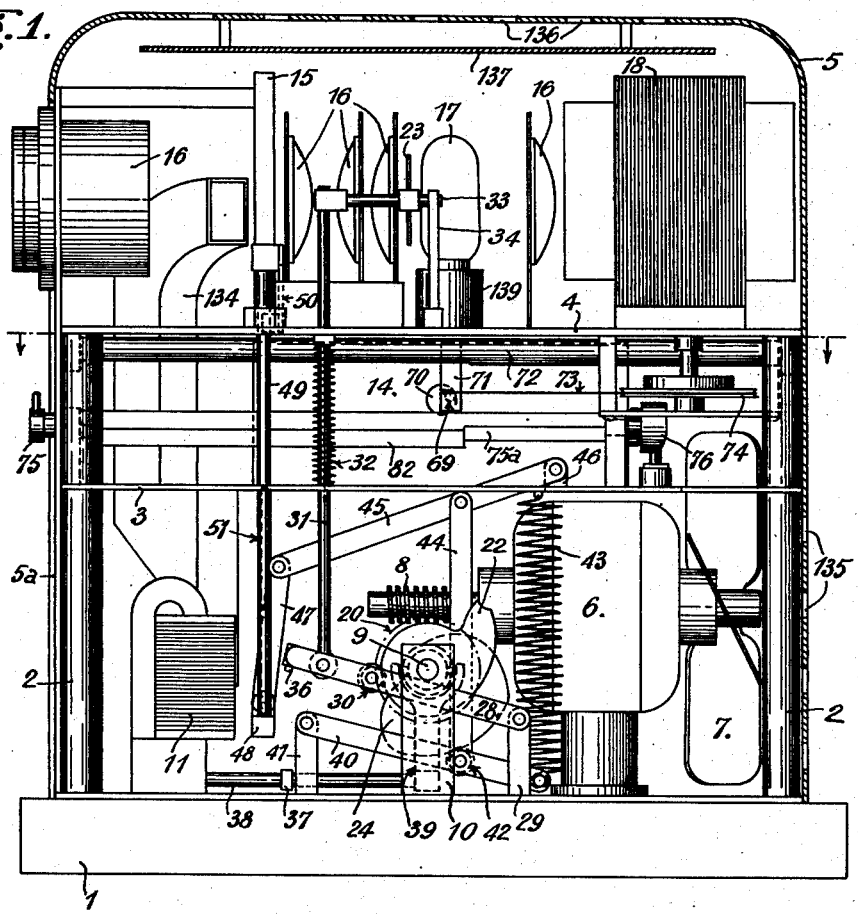
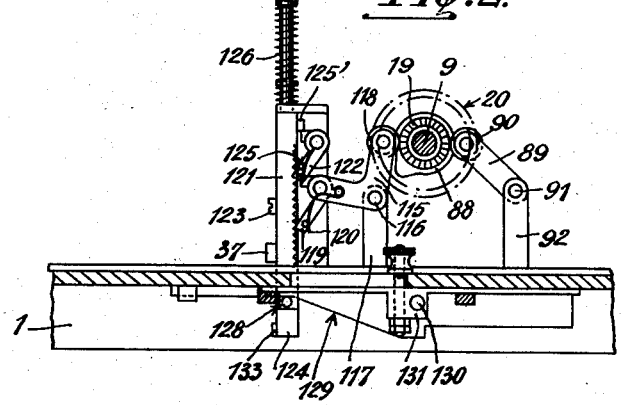
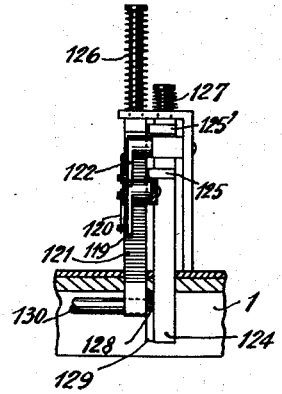
INVENTOR
R. PECHKRANZ
BY
ATTORNEY.

June 4, 1946.  R. PECHKRANZ  2,401,506
PROJECTION APPARATUS
Filed Oct. 23, 1942  3 Sheets-Sheet 2
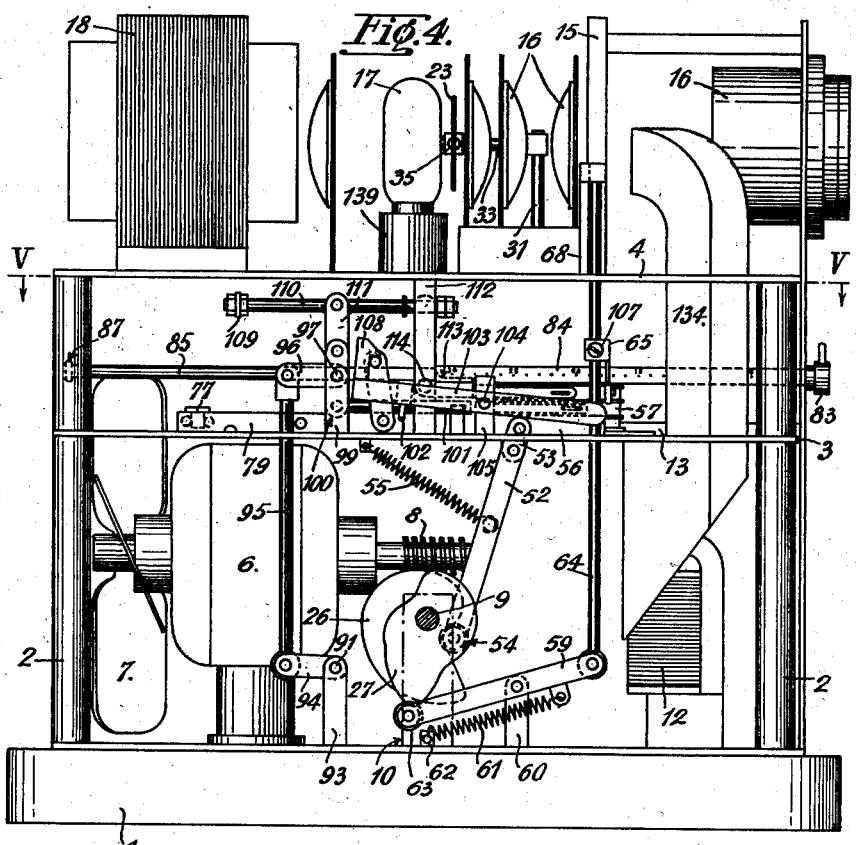
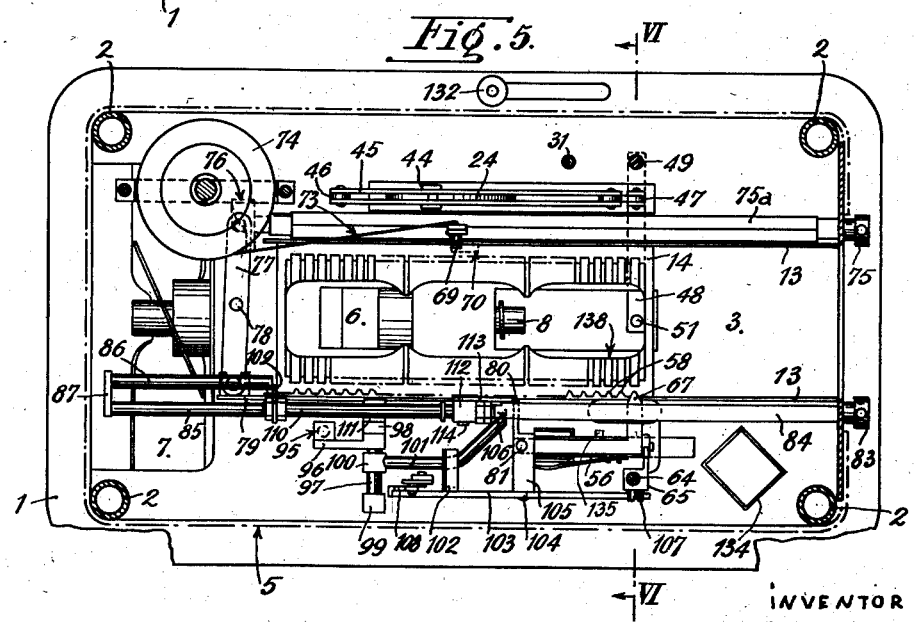
INVENTOR
R. PECHKRANZ
BY
ATTORNEY.

June 4, 1946.   R. PECHKRANZ   2,401,506
PROJECTION APPARATUS
Filed Oct. 23, 1942   3 Sheets-Sheet 3

Fig. 6.

INVENTOR
R. PECHKRANZ
BY
ATTORNEY.

Patented June 4, 1946

2,401,506

UNITED STATES PATENT OFFICE 2,401,506

PROJECTION APPARATUS

Rodolphe Pechkranz, Geneva, Switzerland

Application October 23, 1942, Serial No. 463,296
In Switzerland October 28, 1941

6 Claims. (Cl. 88—28)

The present invention relates to a projection apparatus with controlled changing of slides (operated mechanically, pneumatically or electrically, from a distance if desired), characterised in that it comprises means for receiving a rectilinear magazine containing a certain number (30, for example) of slides (this term covers either plates or films, the latter in a frame or between two assembled glass plates) arranged parallel one after another, means for moving this magazine forwards step by step, means for extracting, at each half of the magazine, a slide from it and bringing it into projection position, and means for bringing this slide back to its original place in the magazine before the latter advances one step, the whole being disposed in such a way that, immediately after projection, the slides are all replaced in the magazine in their initial order.

The annexed drawings show, as an example, one embodiment of the apparatus according to the invention:

Fig. 1 is a side view of it, supposing its bell-shaped cover to be sectioned.

Fig. 2 is a longitudinal section of one detail and

Fig. 3 is a cross-section corresponding to Figure 2.

Fig. 4 is a side view of the reverse side to that shown in Figure 1, supposing the bell-shaped cover to be lifted off.

Fig. 5 is a horizontal section according to V—V of Figure 4.

Fig. 6 is a cross-section according to VI—VI of Figure 5.

The apparatus shown comprises a rectangular base 1, on which it stands, bearing four pillars 2 supporting two plates 3, 4 parallel with the base 1.

A detachable bell-shaped cover 5 can be slipped over the top, enclosing all the members borne by the base 1 and the plates 3 and 4, as can be seen in Figure 1.

The base 1 carries an electric motor 6 driving a propeller 7 serving as fan and a worm-screw 8, serving to drive at reduced speed a camshaft 9 supported in its turn by two bearings 10 also fixed to the base 1 (Figures 1 and 6). An electro-magnet 11 and an electro-magnet 12 (Figures 1 and 4) are also fixed to this base, the first serving to engage the coupling and the second to disengage the coupling of the camshaft.

The plate 3 bears, fixed on it, slide-bars 13 between which a rectilinear magazine runs longitudinally, containing a certain number (30, for example) of lantern slides arranged parallel one after another. By lantern slides is understood either plates or films, the latter placed in a frame or between two assembled glass plates. The magazine 14 can be inserted into or taken out of the apparatus without its being necessary to lift off the cover 5, thanks to a slit 5a on the front side.

This plate 3 also bears other parts and various bearings that are described farther on.

The plate 4 carries a sash-frame 15 in which are incorporated the slides in course of projection, the set of lenses 16, the lamp 17 and the transformer 18.

On the shaft 9 is free-mounted a coupling-sleeve 19 integral with a helicoidal wheel 20 co-operating with the worm-screw 8. The edge of the sleeve 19 is toothed so as to mesh with similar teeth on a sliding coupling-sleeve 21 on the shaft 9, but angularly integral with the latter. The sleeve 21 is controlled in such a way that its teeth are either engaged or disengaged with those on the sleeve 19. It is seen, then, that the teeth on the coupling-sleeves 19 and 21 form a gear allowing of the transmission of the movement of the helicoidal wheel to the shaft 9 when they are engaged. The shaft 9 bears, locked on it, a cam 22 operating a shutter 23 that intercepts the light-beam from the projection lamp 17 during the operation of changing one slide for another. This shutter, of course, occupies a position that leaves free passage to the light-beam through the set of lenses when a slide is in the projection position. Another cam 24 is also locked on the shaft 9 and this operates the extraction one by one of the slides from the magazine 14, their individual bringing into position for projection and their return into the magazine after projection.

The shaft 9 also bears an electric contact drum 25, the contacts of which are closed at certain given angular positions of the shaft. The role of these contacts will be explained farther on. Finally, the shaft 9 bears two cams 26, 27, the first of which operates the advance step by step of the magazine, so as to ensure the projection of a slide after the preceding one has been automatically returned to the magazine, and the second of which operates a locking and feeling device, serving to immobilize the magazine during the projection and to determine at the same time if there is still in the magazine another slide to project immediately after that in the position of projection.

The different mechanisms driven by the cams just mentioned are successively described below.

Device for operating the shutter 23

This device comprises a lever 28 pivoted at one of its ends on a support 29 fixed to the base 1. This lever 28 bears, fixed between its two ends, a roller 30 constantly held against the cam 22. A vertical rod 31, sliding in guides in the plates 3 and 4, is pivoted at its lower end on the lever 28, near the opposite end to that pivoting on support 29. The rod 31 is constantly pulled upwards by a spring 32 wound round it in the space between the plates 3 and 4. It is this spring that holds in place the roller 30 pressed against the cam 22. At its upper end, the rod 31 bears a horizontal bar 33 fixed to the former at one of its ends; the free end of this bar 33 is guided by a fixed fork 34. The horizontal bar 33 bears the shutter 23 through the intermediary of a short lever 35. It is easily seen that, according to at what distance the roller is from the shaft 9—i. e., according to on which part of the cam it is riding—the shutter is found either in the position shown in the drawings where it intercepts the light-beam intended for the objective or lowered below this position out of the course of the light-beam.

The free end of the lever 28 bears a stop 36 which strikes against a lever 37, fixed on a shaft 38, angularly integral with a throw-out fork 39 controlling the coupling-sleeve 21 of the gearing. When the stop 36 strikes the lever 37, following on the lowering of the shutter through the effect of the cam 22, the shaft 38 is bound to revolve clockwise on Figure 6, which brings about the disengagement of the coupling-sleeves 19 and 21. This happens when the shutter 23 arrives at its lowest position.

Device controlling the slides

This device serves to extract the slides one by one from the magazine 14, to bring forward each slide so extracted to the projection position, then to return it to the magazine and to extract the next slide and so on, in such a way that there is never more than one slide at a time out of the magazine. This device comprises a lever 40 pivoting at one of its ends on a support 41 fixed to the base 1. This lever bears, between its two ends, a roller 42 kept constantly pressed on the cam 24 by a spring 43 hooked to the plate 3. A crutch 44 joins the lever 40 to another rocking-lever 45, pivoted at one of its ends on a support 46 borne by the plate 3. The other end of the lever 45 is pivoted on a connecting-rod 47, acting on a horizontal bar 48, to one end of which is fixed a vertical rod 49 guided by the plates 3 and 4 and bearing at its upper end an elbow-piece 50 intended to act on the slide so as to help it to descend again into the magazine. The horizontal bar 48 bears, at its other end, a vertical rod 51 acting from below on the slide to be brought into the projection position, by lifting it and making it run between the guides 15.

When the roller 42 draws near the shaft 9 by riding the cam 24, the rod 51 ascends, yielding to the action of the spring 43, and a slide is brought into the projection position. When, on the contrary, the cam 24 drives the roller away from the shaft 9, the elbow-piece 50 forces the slide, locked in the guides 15, to return to its place in the magazine.

Device for advancing the magazine step by step

This device comprises a lever 52 pivoted, close to one of its ends, on a support 53 fixed to the plate 3. This lever bears, at its other end, a roller 54 constantly held against the cam 26 by a spring 55 hooked to the plate 3. The upper end of the lever 52 drives backwards and forwards a carriage 56 (seen in Figures 4, 5 and 6). This carriage bears a forwarding pawl 57 co-operating with a rack 58 cut on one of the lateral sides of the magazine. The width of each tooth of this rack 58 measured at the basis of the tooth is equal to the distance between the center planes of two adjacent slides. Thus, one revolution of the cam 26 causes the magazine to advance by the action of forwarding pawl 57 entering into the space between two teeth of the rack to the extent of the width of one tooth which is equal to the distance between two slides; simultaneously the pawl 57 is returned into its initial position by carriage 56.

Locking and feeling device

This device comprises a lever 59, pivoting between its two ends on a support 60 fixed to the base 1 and pulled by a spring 61 hooked at 62 to the base 1. This lever bears, at one of its ends, a roller 63, constantly held against the cam 27 by the spring 61. To the other end of the lever 59 is pivoted the lower end of a vertical rod 64 guided through the plates 3 and 4 and bearing, in the space between these two plates, a member 65 provided with an inclined plane 66 forming a wedge (Figure 6). When the member 65 descends, the inclined plane 66 immobilises a ratchet 67 placed above the pawl 57 and co-operating also with the rack 58. The role of this ratchet 67 is to keep the magazine stationary during the return movement of the pawl 57 which, in the absence of the ratchet 67, would tend to bring the magazine back with it.

The rod 64 bears, at its upper end, a feeler 68 which serves to determine if there is, in the magazine, a slide following that at the moment in projection position. The operation that this feeler controls are described below.

Automatic return of the magazine under the control of the feeler 68

When the magazine 14 is inserted in the apparatus, it freely runs along the slide-bars 13 up to the point where a pin 69 (Figure 6) engages in a little notch 70 on the side of this magazine. From that moment, the magazine cannot advance without a tendency to move backwards, for this pin 69, fixed to a lug 71 integral with a shock-absorbing piston sliding in a pneumatic tube 72 (Figures 1 and 6) is pulled backwards by a cable 73, winding in a groove of a spring-box 74 containing a return-spring not shown in the drawings. Normally, however, the magazine cannot move backwards, for it is arrested, at the moment of its advance, by the pawl 57 and, when the pawl has ceased its action, by the ratchet 67, itself kept engaged with the rack 58 by the inclined plane 66.

So that the magazine may obey the pull of the spring in the spring-box 74, and move backwards, the pawl 57 and the ratchet 67 must be simultaneously disengaged from the rack. Due to stop 135 provided at the side of ratchet 67 adjacent to the magazine and slightly projecting downward therefrom over pawl 57 the ratchet when rotated about pivot 104 by lug 80, as described later on, takes along pawl 57; therefore, the disengagement of the ratchet involves that of the pawl. The release of the magazine—i. e., its disengagement from the ratchet of the rack— can be brought about in two ways: by hand or automatically.

Release of the magazine by hand

The ratchet 67 must be disengaged from the rack when it is desired to take the magazine out of the apparatus. This is done through the following parts:

A knob 75 appearing on the front face of the apparatus (Figures 1 and 5) allows of the turning of a bar 75a bearing a cylindrical cam 76 (Figure 1). When the knob 75 is turned, the cam 76, turning with it, rocks a lever 77 on a pivot 78 (Figure 5). The other end of this lever 77 pushes towards the front of the apparatus (so towards the right on Figure 5) a bar 79 acting on a lug 80 integral with the ratchet 67 (Fig. 5). The ratchet is thereby rotated about pivot 81 and its tip is withdrawn from the rack 58 of the magazine. As the ratchet brings the pawl with it, as has been described above, the magazine is no longer held back by these two members. The bar 75a bears a longitudinal boss 82 (Figure 6) which separates the pin 69 from the magazine when this bar is turned clockwise on Figure 6. The magazine is then totally released and can be taken out of the apparatus.

Extraction of the magazine from the apparatus and checking of the number of the slide projected A knob 83, in line with the knob 75 in relation to the median longitudinal plane of the apparatus (Figures 4 and 5) allows of drawing out from the apparatus a scaled square bar 84 lengthened at the back by a round bar 85 joined to a parallel round bar 86 by a bridge 87. The free end of the bar 86 pushes the magazine towards the front (i e., to the right on Figure 5). When the knob 83 is pulled, the magazine resists if the latter is held back by the locked ratchet 67. In the first case, the magazine is pushed out of the apparatus up to a point where it is possible to seize it with the hand; in the second case, the scaled rule projects from the apparatus to an extent that depends on the serial number of the slide which is in the projection position. The graduations of this rule are scaled in such a way as to indicate at once the serial number of the slide.

Automatic release of the magazine

The object of this automatic release, as was described above, is to allow the magazine to be drawn back by the spring in the spring-box 74 in the case of the automatic functioning of the apparatus.

The helicoidal wheel 20 is integral with a cam 88 (Figure 2). Once in every revolution, this cam raises a rocking-lever 89 bearer of a roller 90. This lever is itself borne by a shaft 91 turning in the bearings 92, 93 (Figures 2 and 4. This shaft is integral with a crank 94, raising and lowering a connecting-rod 95 at each revolution of the shaft 9. This connecting-rod is pivoted on another crank 96 borne by a short shaft 97 (Figure 5), revolving in the bearings 98, 99. The shaft 97 bears a crank 100, only partially seen as a dotted line in Figure 4, behind the bearing 99. To this crank is pivoted a pusher 101 running in a ring 102 integral with a beam 103 pivoting at 104 on a support 105 integral with plate 3. This pusher 101 is, therefore, motivated at each revolution of the helicoidal wheel to effect a horizontal to-and-fro movement. The end 106 of the pusher 101 does not normally, however, touch the lug 80 of the ratchet 67, because it passes underneath it.

If the feeler 68 does not encounter a slide in the slot of the magazine immediately following that of the slide projected, rod 64 will at the moment when the cam 27 allows of this movement, further descend and a projection 107 attached to part 65 will impact lever 103 and cause it to rotate about pivot 104. The left hand end (see Fig. 5) of the lever 103, which bears a dog 108, rises and takes up with it the ring 102. Because of that, the pusher 101 now directs its tip 106 against the lug 80 of the ratchet 67 and, by its to-and-fro movement, disengages the ratchet, and with it, as was seen above, the catch, from the magazine. The magazine can then yield to the pull of the spring in the spring-box 74 and return right to the back of the apparatus to its point of departure. At the end of its run, the magazine 14 meets a stop 109 integral with a horizontal rod 110 supported by a crank 111 and which can slide for a few millimeters in a pillar 112 fixed to the plates 3 and 4. A crank member 113 (seen only as a dotted line in Figure 4) acting on the end of the lug 80 of the ratchet 67, pivoting at 114 and on which the rod 110 acts, causes the pivoting and the release of the ratchet 67 and the pawl 57, which stopped in the open position. The dog 108 of the beam 103 has also been disengaged. The ring 102 has descended and the pusher 101 is rendered inactive, for it begins again to pass underneath the lug 80 of the ratchet 67.

Electrical coupling and uncoupling

The apparatus is planned to operate the changing of slides by itself when the user, a lecturer for example, closes an electric circuit by a switch not shown and which could very well be at a long distance from the apparatus. The coupling electromagnet 11 (Figure 1), when it is energised by the closing of the circuit in question, acts on an armature not shown fixed to the shaft 38, making this shaft revolve anti-clockwise on Figure 6, which, thanks to the throw-out fork, couples the teeth of the sleeves 19 and 21 of the gearing.

The uncoupling then automatically takes place after one revolution of the camshaft, when a fresh slide is in projection and that is due to the stop 36, which acts on the lever 37 fixed to the shaft 38, making that shaft revolve clockwise on Figure 6.

When the last slide in the magazine has been projected and has returned to the magazine, the camshaft must stop in the position shown in the drawings. Now, at that moment, the pusher is at the top of its stroke, since the shutter is closed— i. e., it intercepts the light-beam. An electrical uncoupling has therefore to be provided for. The circuit of the uncoupling electromagnet 12 is closed by a cut-out not shown, constituted by a contact co-operating with the contact cylinder 25. The uncoupling electro-magnet 12, Figure 4, acts on an armature (not shown) fixed to the shaft 38, making that shaft revolve clockwise on Figure 6, and that, through the intermediary of the throw-out fork 39 (Figure 6), separates the two sets of teeth on the sleeves 19, 21.

Counting device

If the apparatus has to function automatically—for example, if it is to be used for publicity purposes—the counting device that is now to be described intermittently and automatically works the coupling each time an adjustable specified interval has passed. This interval is "counted" by the device as a number of revolutions of the camshaft.

The cam 88, integral with the helicoidal wheel 20, the same one that releases the magazine, acts once every revolution on a bent toggle-lever 115, pivoting at 116 on a support 117 fixed to the base 1. One of the arms of this lever bears, in fact, a roller 118 riding on this cam, while its other arm bears a pawl 119, pulled, by a spring 120, to co-operate with a vertical rack 121. This pawl, at each revolution of the cam 88, lowers the rack 121 one pitch and the rack is held in this new position by a ratchet 122, while the pawl 119 returns to its original position. When this rack has descended far enough, the head of a screw 123 fixed on it swings the branch of the lever 37 opposed to that on which the stop 36 acts, as was seen above. This movement of the lever 37 rocks the shaft 38 anticlockwise on Figure 6 and that ensures the co-operation of the sleeves 19, 21 of the coupling-gear through the intermediary of the fork 39. The afore-mentioned movement of the lever 37 has also for effect to lower a counter-rod 124 which, by means of two pins 125, 125', acts on a horizontal branch of the pawl 119 and the ratchet 122 so as to separate them from the rack. This rack, constantly pulled upwards by a spring 126, returns to the upper position and is thus ready to be moved pitch by pitch downwards again by the pawl. The camshaft has started revolving and, 360° later, the stop 36 of the lever 28 belonging to the device working the shutter causes the uncoupling by rocking the lever 37. The counter-rod 124 can in its turn ascend again through the effect of a spring 127.

*Regulating the time of the projection*

The manner of regulating the time interval during which the projection takes place under the control of the counting device just described is as follows:

When the rack 121 ascends, a boss 128 that it bears strikes against an inclined plane 129, Figure 2. This inclined plane occupies an adjustable position. In Figure 2 it is shown in its extreme position to the right. If it is moved towards the left (on Figure 2) by the intermediary of parts 130, 131 and held in its new position by means of a milled nut 132, the rack ascends less high than before and consequently it has fewer pitches to pass to arrive at the bottom position. So, changing the position of the inclined plane 129 by means of the nut 132, the number of revolutions is regulated—i. e., the time during which each slide is projected. The inclined plane 129 fulfills another accessory function. Pushed completely to the left, it lowers the counter-rod 124 by its boss 133. The pawl and the ratchet are disengaged by this counter-rod and the counting device is rendered inactive. The apparatus is then in position for semi-automatic working by means of the electric push-button.

*Semi-automatic working of the apparatus*

The inclined plane 129 is brought to its extreme left position on Figure 2. By means of a switch not shown, the lamp is lit and the motor started. The camshaft 9 is in the position shown in the drawings, to be called the zero degree position. Pressure on an electric push-button starts the camshaft by means of the electro-magnet 11. The locking of the ratchet of the magazine first takes place, then a slide ascends to the projection position, the shutter 23 comes away from the light-beam and, at the end of its course, causes the uncoupling of the teeth of the sleeves 19, 21. The camshaft is at 180° from its point of departure. It stops, while the motor, the worm-screw, the helicoidal wheel and the cam 88 continue to revolve. The cam 88 has no action, for, in this position of the inclined plane 129, the counting device and also the feeler are neutralised. The lamp, the lenses and the slide which is in projection position are cooled by the air coming from the fan 7 and directed along suitable air-shafts of which one can be seen at 134. Nothing happens till the user presses the control button, energising afresh the coupling electro-magnet. The camshaft starts revolving, the shutter closes, the slide descends, the magazine advances one pitch, the ratchet of the magazine is locked, a fresh slide ascends into the projection position, the shutter opens and causes the uncoupling. We are again at 180°.

This cycle is renewed with each pressure on the control button until all the slides have passed or until action on a main switch has extinguished the lamp and electrically set the camshaft in motion. Then the shutter closes, the slide descends into the magazine, which advances one pitch, but the contact cylinder 25 operates the final uncoupling in the zero position of the camshaft. Finally, the motor, to which current has been furnished by the contact cylinder despite the interruption of the general switch, stops because the current from the drum is cut off several degrees before zero position.

*Automatic working of the apparatus*

The inclined plane 129 is elsewhere than in its extreme-left position on Figure 2. The departure is the same as for semi-automatic working up to the 180° position of the camshaft. The push-button has no action, its circuit is closed by a contact which is neutralised only for this extreme-left position of the inclined plane 129; the counting device is working. After the rack has progressed downwards for a specified number of pitches, it mechanically operates the coupling: the camshaft then makes a complete revolution and returns to 180°, effecting all the operations described in the preceding paragraph. At the re-opening of the shutter, the uncoupling is automatically effected and the counter begins working again.

If the feeler, which is feeling while the slide in projection is returning to its place, meets with no resistance—that is, if the next slot of the magazine is empty—it causes the switch-over of the pusher 101 which separates the pawl and the ratchet from the magazine. The magazine, pulled backwards, strikes a stop which causes the pawl and the ratchet to go back into place, and, furthermore, occasions a fresh electrical coupling and the whole cycle recommences, the successive slides being again projected in their turn.

*Cooling device*

The fan 7 draws the air into the apparatus through holes 135 provided on the lower part of the back wall of the cover 5. Holes 136 are provided in the top of the cover to let the air escape. A screen 137 consisting of a solid metal plate fixed at a short distance from the top of the cover prevents the light from the lamp 17 from reaching the apertures 136. It is easily understood that, when the motor revolves, the air drawn into the apparatus by the fan 7 is forced through the air-duct 134 against one side of the slide in projection position in the sash-frame 15. The other side of this slide is cooled by the air-current perpendicularly passing through the magazine 14 owing to the opening 138 in the bottom of this magazine and through the gaps between the different slides that it contains. The air-current through this magazine is particularly intense in the space left empty by the slide actually in the projection position. In this way, the slide is cooled on its two sides and runs no risk of being injured by an increased temperature due to the powerful radiance of the lamp 17.

The lamp 17 is preferably provided with a bayonet-holder fixed in a socket 139 placed in such a way that there is, between the neck of the lamp and the inside of the socket a ringed space through which a stream of air flows upwards under the influence of the fan. This stream of air completely encircles the neck and body of the lamp. Owing to its circulation in a direction parallel with the axis of the lamp, the air keeps the neck of the lamp at a low temperature.

What I claim is:

1. A projection apparatus comprising a rectilinear magazine containing a plurality of slides in parallel adjacent relationship, a shutter, a main shaft, a motor to drive said shaft, a coupling on said shaft to drivingly connect the same with said motor and to disconnect the same, a cam on said main shaft, a roller carrying rod and lever system actuated by cooperation of said roller with said cam to lift during each revolution of the latter one slide from said magazine into the projecting position and to return the slide after projection into said magazine, a second cam on said main shaft, a roller carrying lever to be reciprocated by cooperation of said roller with said cam, a magazine forwarding pawl connected with said reciprocating lever, a toothed rack adapted to be displaced by said forwarding pawl attached to said magazine, the width of each tooth corresponding to the distance between two slides, whereby the magazine is moved during each revolution of said cam at the extent of one tooth equal to the distance between two slides, a third cam on said main shaft, a roller carrying rod and lever system actuated by cooperation of said roller with said cam to lift during each revolution of the latter said shutter into the obturating position during the lowering of the slides into the magazine and to lower the shutter out of the obturating position during the lifting of the slides into the projecting position, a fourth cam on said main shaft, a roller carrying lever and rod system actuated by cooperation of said roller with said cam to lift and to lower said rod, an inclined plane carrying member attached to said vertical rod to immobilize upon descent of said rod the magazine by said inclined plane member at each revolution of the cam during the lifting from and the return of the slides into the magazine.

2. A projection apparatus comprising a rectilinear magazine containing a plurality of slides in parallel adjacent relationship, a shutter, a main shaft, a motor to drive said shaft, a coupling on said shaft to drivingly connect the same with said motor and to disconnect the same, a cam on said main shaft, a roller carrying rod and lever system actuated by cooperation of said roller with said cam to lift during each revolution of the latter one slide from said magazine into the projecting position and to return the slide after projection into said magazine, a second cam on said main shaft, a roller carrying lever to be reciprocated by cooperation of said roller with said cam, a magazine forwarding pawl connected with said reciprocating lever, a toothed rack adapted to be displaced by said forwarding pawl attached to said magazine, the width of each tooth corresponding to the distance between two slides, whereby the magazine is moved during each revolution of said cam at the extent of one tooth equal to the distance between two slides, a third cam on said main shaft, a roller carrying rod and lever system actuated by cooperation of said roller with said cam to lift during each revolution of the latter said shutter into the obturating position during the lowering of the slides into the magazine and to lower the shutter out of the obturating position during the lifting of the slides into the projecting position, a fourth cam on said main shaft, a roller carrying lever and rod system actuated by cooperation of said roller with said cam to lift and to lower said rod, an inclined plane carrying member attached to said vertical rod to immobilize upon descent of said rod the magazine by said inclined plane member at each revolution of the cam during the lifting from and the return of the slides into the magazine, an angular feeler attached to the upper end of said vertical rod to project into the magazine and to determine the presence of a slide following the one in the projecting position.

3. A projection apparatus comprising a rectilinear magazine containing a plurality of slides in parallel adjacent relationship, a shutter, a main shaft, a motor to drive said shaft, a coupling on said shaft to drivingly connect the same with said motor and to disconnect the same, a cam on said main shaft, a roller carrying rod and lever system actuated by cooperation of said roller with said cam to lift during each revolution of the latter one slide from said magazine into the projecting position and to return the slide after projection into said magazine, a second cam on said main shaft, a roller carrying lever to be reciprocated by cooperation of said roller with said cam, a magazine forwarding pawl connected with said reciprocating lever, a toothed rack adapted to be displaced by said forwarding pawl attached to said magazine, the width of each tooth corresponding to the distance between two slides, whereby the magazine is moved during each revolution of said cam at the extent of one tooth equal to the distance between two slides, a third cam on said main shaft, a roller carrying rod and lever system actuated by cooperation of said roller with said cam to lift during each revolution of the latter said shutter into the obturating position during the lowering of the slides into the magazine and to lower the shutter out of the obturating position during the lifting of the slides into the projecting position, a fourth cam on said main shaft, a roller carrying lever and rod system actuated by cooperation of said roller with said cam to lift and to lower said rod, an inclined plane carrying member attached to said vertical rod to immobilize upon descent of said rod the magazine by said inclined plane member at each revolution of the cam during the lifting from and the return of the slides into the magazine, an angular feeler attached to the upper end of said vertical rod to project into the magazine and to determine the presence of a slide following the one in the projecting position, a projection carried by said rod to terminate upon further descent of said rod due to absence of a slide the immobilisation of said magazine, and means to return the now freely movable magazine into its initial position.

4. An automatic continuously operable slide projector comprising in combination a frame, a rectangular slide magazine located in said frame, a plurality of slides arranged in parallel adjacent relationship in said magazine, a shutter, a magazine locking and slide presence determining device, a motor underneath said magazine, and a main shaft driven by said motor, a coupling on said shaft to drivingly connect the same and the motor and to disconnect the latter, a cam on said shaft, means operated by said cam to advance said magazine for the distance of two adjacent slides, said means including a roller carrying lever to be reciprocated by cooperation of said roller with said cam, a spring to keep said roller in permanent contact with said cam, a carriage to be displaced by said lever, a magazine forwarding pawl carried by said carriage, a toothed rack adapted to be displaced by said forwarding pawl, said rack being attached to said magazine, the width of each tooth corresponding to the distance between two slides, whereby said magazine is moved during each revolution of said cam for the distance of two slides, a second cam on the same shaft, means operated by said second cam to extract the slides one by one from the magazine to move the same into the projection position and to return them after projection to the magazine before the magazine can be advanced, said means including a lever supported movable roller, a spring to keep said roller in permanent contact with said cam, a leverage system controlled by said roller to lift the slides, and guides to receive the slides to lead the same into the projection position and to return them into the magazine, a third cam on the same shaft, means operated by said third cam to move said shutter into the obturating position, while a slide is returned into the magazine, and to remove the shutter therefrom when the next slide is lifted into the projection position, said means including a lever supported movable roller, a spring to keep said roller in permanent contact with said cam, a lever and rod arrangement connected with said shutter to move the same upward into the obturating and downward into the non-obturating position, a stop carried by said roller supporting lever, means actuated by said stop to disengage said motor coupling when the shutter is in its lowest position, a fourth cam on the same shaft, means operated by said cam to arrest the magazine during the projection and to determine the presence of unused slides, said means including a lever supported movable roller, a spring to keep said roller in permanent contact with said cam, a rod and lever arrangement operated by said roller carrying lever to actuate a magazine locking ratchet, and a feeler actuated by said rod to project into said magazine and to determine if there is a slide in the magazine following that in projecting position.

5. In an automatic continuously operable slide projector according to claim 4, means operated by the feeler upon determination of the absence of a slide following that in projection position to release the magazine from its arrested position, a pulling member to return the released magazine, and a stop to limit the return passage in the initial position.

6. In a projection apparatus according to claim 1 the rod and lever system to lift the slides into the projecting position and to return the slides into the magazine including a vertically movable horizontal bar, carrying at its one end a vertical shorter rod to lift the slides during the ascent of said bar into the projecting position and carrying at its other end a vertical longer rod terminating into an elbow piece to push the slides during the descent of said bar into the magazine.

RODOLPHE PECHKRANZ.